United States Patent [19]

Bortnick et al.

[11] Patent Number: 5,453,476
[45] Date of Patent: Sep. 26, 1995

[54] HIGH SOLIDS COPOLYMERIZATION VIA IN-SITU ISOMERIZATION

[75] Inventors: Newman M. Bortnick, Oreland; Norman L. Holy, Penns Park, both of Pa.

[73] Assignee: Rohm and Haas Company, Philadelphia, Pa.

[21] Appl. No.: 110,455

[22] Filed: Aug. 23, 1993

[51] Int. Cl.$^6$ .................................................. C08F 2/00
[52] U.S. Cl. ..................... 526/222; 526/272; 526/348.2; 526/348.3; 526/348.4; 526/347
[58] Field of Search ........................... 526/222, 272, 526/348.2, 348.3, 348.4

[56] References Cited

U.S. PATENT DOCUMENTS

| | | | |
|---|---|---|---|
| 3,087,962 | 4/1963 | Bortnick | 260/486 |
| 4,048,422 | 9/1977 | Sackmann et al. | 526/272 |
| 4,151,336 | 4/1979 | Sackman et al. | 526/15 |
| 4,152,312 | 5/1979 | Sackmann et al. | 526/272 |
| 4,162,233 | 7/1979 | Kramer | 526/221 |
| 4,282,342 | 8/1981 | Denzinger et al. | |
| 4,358,574 | 11/1982 | Hughes | 526/339 |
| 4,403,080 | 9/1983 | Hughes | 526/76 |

FOREIGN PATENT DOCUMENTS 245193  4/1987  Germany.

*Primary Examiner*—Bernard Lipman
*Attorney, Agent, or Firm*—Roger K. Graham

[57] ABSTRACT

An improved process for the free radical copolymerization of a mixture of olefins and a polar monomer is disclosed. The process requires the catalytic isomerization of internally-unsaturated olefins to terminally-unsaturated olefins during the copolymerization reaction. The process results in improved yields in terms of solid product formation and in lower costs than conventional processes. The process is especially useful for the preparation of diisobutylene-maleic anhydride copolymers.

9 Claims, No Drawings

"5,453,476"

HIGH SOLIDS COPOLYMERIZATION VIA IN-SITU ISOMERIZATION

FIELD OF THE INVENTION

This invention relates to an improved process for the copolymerization of polar monomers with mixtures of olefins. The olefins of this invention are always monounsaturated olefins. These olefin mixtures contain monounsaturated olefins in which the carbon to carbon double bond is between a carbon atom at the end of the molecule and the adjacent carbon, referred to hereinafter as terminal unsaturation, and monounsaturated olefins in which the carbon to carbon double bond is between carbons that are not at the end of the molecule, referred to herein as non-terminal unsaturation. Olefins containing non-terminal unsaturation are unreactive in free radical copolymerizations. The present invention relates to a process for isomerizing such non-terminal unsaturation in situ during the copolymerization of the olefin mixture with polar monomers.

BACKGROUND OF THE INVENTION

It has been known for many years that the free-radical-initiated copolymerization of monounsaturated olefins is truly satisfactory only with monomers which have high "e" values. Monounsaturated olefins are molecules containing only carbon and hydrogen atoms and without aryl groups and without any functional group, such as halogen, carboalkoxy, and the like, and further containing only one carbon-carbon double bond. An "e" value of a monomer is a measure of the polarity of the monomer, or more accurately the electron-attracting or electron-donating attributes of the substituents on the monomer. The "e" values are calculated numbers, but are based on copolymerization data. They range from −1.58 for vinyl t-butyl ether, a monomer with electron-donating functionality to about 0 for a non-polar material with no electron-donating or -withdrawing groups (ethylene) to +2.25 for a highly polar material, such as maleic anhydride and the like, which usually contain two strongly electron-withdrawing groups. The Q-e calculations are well-known to the polymer art and are found, inter alia, in "Polymer Handbook, 3rd edition, John Wiley and Sons, 1989, page II-267. In order for a monounsaturated olefin to effectively copolymerize with a polar monomer, the "e" value of the polar molecule must be at least about +1.2.

Relatively few polar monomers have high enough "e" values (at least +1.2) to form alternating copolymers with non-functionalized monoolefins. Useful polar monomers, which usually contain two strongly electron-withdrawing groups, include maleic anhydride, maleimide, N-substituted maleimides, a-cyanoacrylate esters, vinylidene cyanide, and the like. Of these, maleic anhydride is preferred for cost, and because many of the uses for the copolymer involve the copolymerized anhydride group, more often in its hydrolyzed form as the acid or salt.

It is further known to be far more favorable for terminally unsaturated monoolefins, such as ethylene, propylene, isobutylene, 2,4,4-trimethylpentene-1, 4,6-dimethylheptene- 1, and the like, to copolymerize with polar monomers having "e" values in the above range than for monounsaturated olefins with internal or non-terminal unsaturation, such as 2,4,4-trimethylpentene-2, 4,6-dimethylheptene-2, and the like.

In many instances, a terminally-unsaturated olefin can be obtained in a pure form, but in others, such as from acid-catalyzed oligomerization of low molecular weight olefins such as propylene and isobutylene, the terminally-unsaturated olefin formed is mixed with an internally-unsaturated or non-terminally unsaturated double bond. The mixtures of olefins are extremely difficult to separate by inexpensive physical means, such as distillation. In the presence of a catalyst, such as a strong acid, a purified olefin will revert to an equilibrium mixture of olefins, the equilibrium value being specific to each olefin. For example, the equilibrium value for commercial diisobutylene is ca. 76% 2,4,4-trimethylpentene-1 and 24% 2,4,4-trimethylpentene-2.

The problem with copolymerizing polar monomers with mixtures of olefins is that the relative concentration of the unpolymerizable non-terminal olefin isomer increases during the copolymerization reaction. The presence of the unreacted olefin in the product reduces the desired solids level in the product. The increasing concentration of the unpolymerizable non-terminally unsaturated olefin monomer in the copolymer product requires it typically to be stripped from the reaction and burned.

The mixture of monounsaturated olefins may be removed during or after the copolymerization. The removed olefins may then be subjected to a separate isomerization reaction to re-isomerize the mixture back to the initial equilibrium amount of the terminally-unsaturated olefin. The re-isomerized olefin mixture is then returned to take part in the copolymerization reaction. Apart from higher capital equipment costs, the external isomerization is difficult to coordinate with the on-going copolymerization in terms of rates of polymerization and feed schedules.

U.S. Pat. No. 4,151,336 describes a conventional diisobutylene olefin mixture/maleic anhydride copolymerization process which requires ( Examples 1 –4) high ratios of diisobutylene to maleic anhydride, produces a relatively low solids product and requires the removal of the unreacted diisobutylene, which at the point of removal is high in non-terminal olefin content.

The copolymer of "diisobutylene" with maleic anhydride is a commercially useful product. Industrial uses include use as components of preprint overlayer varnishes, laminating inks, preprint inks, paper sizings, components of water treatment additives, detergents, and the like. This copolymer is actually the copolymer of the terminally unsaturated diisobutylene isomer 2,4,4-trimethylpentene-1 with maleic anhydride. For many years the industry has sought means to effectively incorporate most or all of the diisobutylene charged (generally about a 3/1 mixture of the 1- and 2-isomers),to yield a higher solids product with less residual material to remove, and without the need for off-line isomerization.

SUMMARY OF THE INVENTION

We have discovered an improved process for preparing a copolymer from a mixture of unsaturated olefins, wherein at least one of the unsaturated olefins contains non-terminal unsaturation and, one or more unsaturated non-olefinic monomers wherein at least one of the unsaturated non-olefinic monomers is a polar monomer of "e" value greater than about plus 1.2, and where the improvement comprises contacting the monomer mixture present during the copolymerization with an isomerization catalyst and isomerizing the non-terminally unsaturated olefin to a terminally unsaturated olefin.

The advantages of the invention are that the process may be conducted with an overall shorter processing time than in the absence of the isomerization catalyst, and may be conducted at a higher solids level, due to the lower amount of the diluting non-terminal olefin. Further advantages include improved purity of the final product, since there is less unreacted non-terminal olefin to remove. Also, less excess monounsaturated olefin need be charged to the reaction mixture, lowering raw material costs.

A particular advantage is that the monounsaturated olefin is more effectively utilized during the reaction, as there is no build-up of unreactive non-terminal olefin, since it is catalytically isomerized to the starting equilibrium mixture. Thus, there is much less unreactive non-terminal olefin present at the end of the reaction, and less time and energy need be spent in separately isomerizing it to the equilibrium mixture or alternatively, burning or otherwise disposing of the unreactive non-terminal olefin.

DETAILED DESCRIPTION OF THE INVENTION

In the improved process for preparing a copolymer from a mixture of unsaturated olefins and one or more unsaturated non-olefinic monomers wherein at least one of the unsaturated non-olefinic monomers is a polar monomer of "e" value greater than about +1.2, preferably greater than about +1.5, and wherein at least one of the unsaturated olefins contains non-terminal unsaturation, we have discovered an improvement in the process comprising contacting the monomer mixture present during the copolymerization with an isomerization catalyst which isomerizes the non-terminally unsaturated olefin to a terminally unsaturated olefin.

It is preferred that the mixture of unsaturated olefins contains at least one terminally unsaturated monounsaturated olefin having the structure

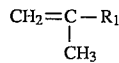

and at least one non-terminally unsaturated olefin is a monounsaturated olefin having the structure

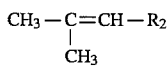

wherein $R_1$ is —$CH_2$—$R_2$ and $R_2$ is an alkyl group of at least 2 carbon atoms, and wherein $R_2$ is most preferably —$C(CH_3)_3$.

The process of the invention is also useful to prepare copolymers of isomerizable monoolefins in addition to "diisobutylene", preferably with those olefins with the

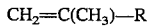

terminal structure, but also to those where the terminal structure is

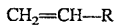

Useful polar monomers, which usually contain two strongly electron-withdrawing groups, include maleic anhydride, maleimide, N-substituted maleimides, a-cyanoacrylate esters, vinylidene cyanide, maleate and fumarate diesters and monoesters, and the like.

It is preferred that the unsaturated polar non-olefinic monomer having an "e" value greater than about plus 1.2 is maleic anhydride. Maleic anhydride is preferred because it does not form significant amounts of homopolymer under the free radical initiated copolymerization reaction conditions typically used for copolymerization with olefins, and further because it leaves an anhydride or (when neutralized) acid residues in the copolymer, which acid provides utility in controlling the solubility, adhesive properties, and the like of the copolymer product.

A second unsaturated non-olefinic monomer may be optionally utilized in the copolymerization reaction. The second non-olefinic monomer may be desirable to react with residual polar monomer, especially when that polar monomer is maleic anhydride, because unreacted maleic anhydride monomer needs to be removed fairly completely to ensure a clean product with a low residual content of maleic anhydride. It is preferred the second unsaturated non-olefinic monomer be a vinyl aromatic monomer, such as styrene.

The isomerization catalyst, useful during the copolymerization reaction to isomerize the non-terminally unsaturated olefin, is a strong acid catalyst. The isomerization catalyst is preferably a strong protonic acid, preferably one which will not under the copolymerization reaction conditions cause the terminally-unsaturated monoolefin to homopolymerize or homo-oligomerize. The formation of significant amounts of trimer or tetramer of the terminally unsaturated olefin during the copolymerization reaction would be undesirable, even if the unsaturation present in such trimers or tetramers were reactive. Such strong protonic acids include sulfonic acids, such as aryl- or alkylsulfonic acids, sulfuric acid, monoesters of sulfuric acid, and the like. For ease in handling, removal, and regeneration, it is especially preferred that the isomerization catalyst be a strong acid ion-exchange resin, such as a sulfonic acid resin or a highly sulfonated, disulfonic acid resin. Such strong acid ion-exchange resins are well-known and commercially available, such as the Amberlyst ®15 and Amberlyst ®XN-1010 resins manufactured by Rohm and Haas Company. From about 0.05 parts to about 0.5 parts of strong-acid resin per 100 parts of monomers and solvent charged is preferred.

It is preferred for product purity and economical re-use of the catalyst that the isomerization catalyst, which is present in the reaction mixture throughout the copolymerization, be capable of easily being physically removed at the end of the reaction. The solid particle form of the ion-exchange resin allows it to be filtered from the aqueous solution, or it may be present in some kind of porous inert container, such as a perforated holder or net, and then removed from the reaction mixture once heating has ceased.

The copolymerization reaction conditions for diisobutylene and maleic anhydride useful in the present process are those generally known to the art, such as in U.S. Pat. No. 4,151,336, and would apply to similar copolymerizations of other mixtures of terminal and non-terminal olefins with monomers of high "e" value. The reaction is preferably run in an inert solvent for those monomers employed, such as toluene and xylene, at temperatures from about 75° C. to about 150° C., utilizing a pressure vessel if necessary. Especially preferred is xylene, as its higher boiling point generates less pressure in a closed reaction system. The solvent amount may be as low as 25% of the total solvent/monomer mixture charged. If the solvent amount is above 60%, the reaction may be conducted effectively, but the economics are poor. A preferred range is from about 25% to below about 60%. Attempts to run in the absence of such solvents give a heterogeneous mixture and poor molecular weight control.

Copolymerization initiation is carried with the use of conventional peroxidic or azo initiators of free-radical polymerization, the reaction being conducted normally for about at least two times the half-life (at the temperature employed) of the chosen initiator. The amount of initiator is usually from about 0.4 to about 1.5 parts per 100 parts of reactants and solvent charged. The ratios of terminal olefin to maleic anhydride is generally at least 1:1 to about 5:1 on a mole basis.

The copolymerization may be initiated by conventional initiators of free-radical polymerization. Preferred are t-alkyl peresters, which are well known as copolymerization catalysts for such olefin-maleic anhydride copolymers, as the initiators decompose at a desirable rate at the reaction temperatures which are convenient for handling the solvents and monomers involved and the pressures generated. In the present system, alkyl hydroperoxides, such as t-butyl hydroperoxide or t-amyl hydroperoxide, or hydrogen peroxide will also be effective.

The monomer mixture may be present at the start of the reaction, or may be added in several increments. If a third non-olefinic monomer is present, it may be added at the start of the reaction, or preferably near the end of the reaction.

The yield of polymer in the present reaction may be calculated in several ways. Based on the conversion of maleic anhydride to polymer (as measured by the amount of residual maleic anhydride detectable by high pressure liquid chromatography), the yields are at least about 95%.

The reaction solids, prior to any isolation or work-up process, are from about 40 to about 85%, with about 70% to about 75% being preferred for ease of stirring and eventual work-up to final product.

EXAMPLE 1

A three-liter pressure reactor, equipped with stirrer, means for adding additional monomer and initiator against internal pressure, means for external heating, means for applying vacuum, and means for removal of contents, was charged under partial vacuum with 286 parts xylene, 875 parts diisobutylene (approximately a 3/1 mixture of the terminal and internal olefinic isomers), 588 grams of maleic anhydride, and 1.8 g. of a sulfonic acid-containing ion-exchange resin in the acid form, known commercially as Amberlyst 15. The residual vacuum was vented with nitrogen, then sealed. The mixture was heated to 120° C. and three additions of initiator solution were made at 45 minute intervals. Each addition of initiator was of a solution of 5.85 parts of t-butyl perbenzoate dissolved in 5 parts of xylene. After the third addition, the reaction mixture was maintained at 120° C. for an additional 45 minutes. Then 17.2 parts of styrene was added, followed after 45 minutes by an additional 12.4 parts of styrene. After 30 minutes, a final addition was made of a solution of 5.85 parts of t-butyl perbenzoate dissolved in 5 parts of xylene. Stirring was maintained for an additional 75 minutes at 120° C. with agitation. The slurry was then removed from the reactor.

EXAMPLES 2–4

The process of Example 1 was repeated but the strong acid resin was not present in the reaction mixture. In Example 2, it was not present at all; in Example 3, it was present in the vapor stream leading to the reflux condenser. In both Examples, the terminally-unsaturated isomer was depleted during the copolymerization with little lowering of the content of the internally-unsaturated isomer, resulting in lower conversion to polymer. Further, the polymerized system tends to phase-separate in the presence of unreacted internally-unsaturated isomer, causing difficulty in stirring. Further, in contrast to the method of Example 1, Example 3 produced measurable amounts of diisobutylene dimer (mixture of hexadecenes).

In Example 4, representing the process described in U.S. Pat. No. 4,151,336, the reaction solids were decreased to ca. 40% and no strong acid resin was present. The process was slower (required about 10% longer for the complete addition process), and the unreacted internal isomer of diisobutylene must be removed.

EXAMPLES 5–7

These examples represent the use of toluenesulfonic acid as the isomerization catalyst, purely to demonstrate the isomerization effect. A process similar to Example 4 was employed. In Examples 5 and 6, a ratio of diisobutylene (both isomers)/maleic anhydride of 1.4/1.0 was employed; in Example 7 the ratio was lowered to 1/1. Example 5 has no acid; Examples 6 and 7 have 0.5% p-toluenesulfonic acid based on diisobutylene charged. Analysis of the xylene solvent prior to the addition of styrene was made by gas chromatography to determine the external/internal content of diisobutylene isomers. The residual maleic anhydride content was also determined at that point of reaction.

| Example | Catalyst | Ratio | % DIB-1/DIB-2 | % Residual maleic anhydride |
|---------|----------|-------|---------------|------------------------------|
| 5 | n | 1.4/1 | 9.7/12.8 | 5.35 |
| 6 | y | 1.4/1 | 12.67/4.0 | 6.27 |
| 7 | y | 1.0/1 | 5.5/1.8 | 7.21 |

The results demonstrate the larger ratio of external isomer available for further reaction as the result of presence of the catalysts, as well as the ability to utilize lower amounts of starting diisobutylene. There was a slight increase in residual maleic anhydride.

We claim:

1. In the process for preparing a copolymer from a mixture of unsaturated monoolefins and one or more unsaturated non-olefinic monomers wherein at least one of the unsaturated monoolefins contains non-terminal unsaturation and wherein at least one of the unsaturated non-olefinic monomers is a polar monomer of "e" value greater than about +1.2, the improvement comprising contacting the monomer mixture present during the copolymerization with an isomerization catalyst and isomerizing the non-terminally unsaturated monoolefin to a terminally unsaturated monoolefin.

2. The process of claim 1 wherein the mixture of unsaturated monoolefins contains at least one terminally unsaturated olefin having the structure

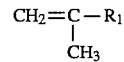

and at least one non-terminally unsaturated monoolefin having the structure

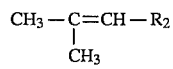

wherein $R_1$ is —$CH_2$—$R_2$ and $R_2$ is an alkyl group of at least 2 carbon atoms.

3. The process of claim 2 wherein $R_2$ is —$C(CH_3)_3$.

4. The process of claim 3 wherein the unsaturated polar non-olefinic monomer is maleic anhydride.

5. The process of claim 4 where a second unsaturated non-olefinic monomer is a vinyl aromatic monomer.

6. The process of claim 5 wherein the vinyl aromatic monomer is styrene.

7. The process of claim 1 wherein the isomerization catalyst is a strong protonic acid.

8. The process of claim 7 wherein the isomerization catalyst is a strong acid ion-exchange resin.

9. The process of claim 8 wherein the isomerization catalyst is present in the reaction mixture throughout the copolymerization and is physically removed at the end of the reaction.

* * * * *